A. Bingham,
Latch.
No. 51. Reissued July 8, 1843.
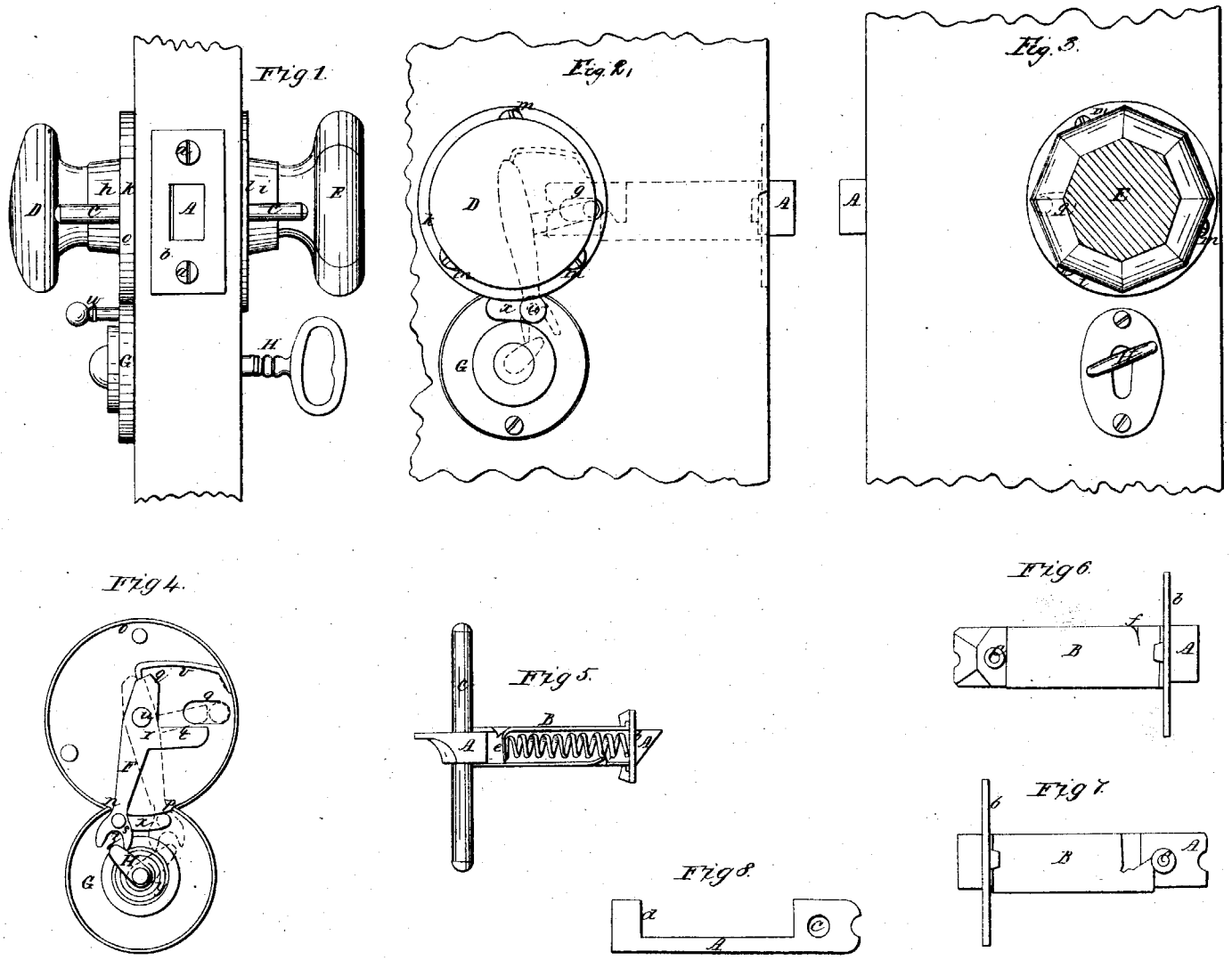
AM. PHOTO-LITHO. CO. N.Y. (OSBORNE'S PROCESS.)

UNITED STATES PATENT OFFICE.

ALBERT BINGHAM, OF BOSTON, MASSACHUSETTS.

IMPROVEMENT IN CHECK-BOLTS FOR DOOR LOCKS OR LATCHES.

Specification forming part of Letters Patent No. 2,819, dated October 17, 1842; Reissue No. 51, dated July 8, 1843.

*To all whom it may concern:*

Be it known that I, ALBERT BINGHAM, of Boston, in the county of Suffolk and State of Massachusetts, have invented certain new and useful Improvements in Door-Locks or Spring-Bolts to be Applied to Doors and other Articles of Furniture; and I do hereby declare that the following specification of the same, taken in connection with the accompanying drawings thereof, forms a full and exact description of my said invention.

Figure 1 of the drawings above mentioned represents a view of the edge of that portion of a door on which the lock is usually applied, the same exhibiting the relative positions of my improved lock or spring-bolt and the stationary knobs or handles. Fig. 2 is a representation of a part of the inner side of the door. Fig. 3 is a similar view of a similar part of the outer side. Fig. 4 is a view of the interior of the inner knob and key-plates. Fig. 5 is a top view of the spring-bolt and its case as detached from the door. Fig. 6 is an elevation of one side thereof. Fig. 7 is an elevation of its opposite side. Fig. 8 is a side elevation of the bolt as removed from its case.

A, Figs. 1, 5, 6, 7, is what I denominate the "spring-bolt," which is inserted in a suitable mortise formed in the door perpendicular to the edge thereof, and is confined in its requisite position by screws *a a*, Fig. 1, passing through the face-plate *b* of the bolt-case B. This latch-bolt is pressed forward by means of a helical or other suitable spring, *c*, the front end of which bears against a shoulder, *d*, Fig. 8, of the bolt, while its rear end rests or abuts against a shoulder, *e*, Fig. 5, of the external case, B. Whenever the bolt is retracted, the distance through which it recedes is regulated by a stop or shoulder, *f*, Fig. 5, suitably formed on the bolt-case, the shoulder *d* of the bolt being brought in contact with the said stop. The front end of the bolt, or that part thereof which projects beyond the face-plate, is beveled down, or formed angular, in a similar manner to spring-bolts in general, and when the door is closed this end of the bolt enters into the usual mortise or cavity formed in the door-case. The rear end of the bolt has a thumb or finger rod, C, passed through it perpendicularly to the bolt, the said rod being of such length as to project a suitable distance beyond the sides of the door and by the sides of the stationary knobs D E, as seen in Fig. 1. A suitable horizontal slot is formed through the door and in each knob-plate for the thumb-rod to move in, the form of this slot being represented at *g*, Fig. 4, and by dotted lines in Figs. 2 and 3. The position of the spring-bolt and its case is also shown by dotted lines in Fig. 2. Both door-knobs are fixed or made stationary in their respective situations—that is to say, their sockets *h i* are firmly attached to circular plates *k l*, as seen in Fig. 1, these plates being confined to the door by screws *m m m*, Figs. 2, 3. The circular plate of the inner knob, D, has a flange, *n o p*, Fig. 4, and *o*, Fig. 1, projecting from its periphery at right angles to the plate, the said flange extending entirely around the periphery, with the exception of a space, *n p*, where it is discontinued for the purpose of permitting the proper action of the check-bolt F, the shape of this bolt being particularly shown in Fig. 4. The check-bolt consists of a piece of metal or lever, *q r s*, which is sustained and moves upon a pin or fulcrum, *u*, and has an arm, *t*, projecting from its side and its top *q*, formed angular and resting and operating against one end of a spring, *v*, as seen in the drawings. A small knob or handle, *w*, extends from the opposite side of the bolt F, the same playing, when the bolt is moved to and fro, in a slot, *x*, formed through the upper part of the key-plate G. This key-plate is suitably arranged with one or more wards, *y*, to receive and sustain the key H, which is inserted into the same from a key-hole formed through the door from its opposite side. When the key is turned upward, its end will enter into a notch or space, *z*, formed in the lower end of the check-bolt, and will move this check-bolt to the right or left at the pleasure of the person who moves the key. When the lower end of the check-bolt is thrown forward, the extremity of the arm *t* rises in rear of the thumb-rod C, and thus prevents the recession of the spring-bolt, such a position of the check-bolt being represented in Figs. 2, 4 by dotted lines; but when the arm *t* is depressed below the rod C the spring-bolt can be freely moved to and fro.

It has been shown that both of the glass knobs D E are immovable, while the spring and check bolts are movable and are operated by other means. When the inner knob is grasped by the hand, it serves not only to give a person a command over the door requisite to move it upon its hinges, but also as a fulcrum for the thumb to rest against while the forefinger presses back the spring-bolt, and for the hand when the check-bolt is operated by means of the small knob *w*. When the outer knob is taken hold of by the hand, the spring-bolt may be retracted by the thumb acting against its rod C. Such knobs and fastenings applied to doors possess many advantages over others in common use. The immobility of the knobs prevents the difficulty so often experienced in other knobs—viz., that of the knob working loose in its socket by reason of the torsion strain to which it is generally subjected in order to move the spring-bolt. Besides, the above arrangement of the knobs requires but very little cutting away of the door in order to fit them. The spring-bolt not being required to overcome the friction of movable knobs, tumblers, and other parts usually connected therewith, may be operated by a very gentle and sensitive spring, so that the force required to throw it back whenever the door is closed may be extremely light in comparison to that which is generally necessary. Here one bolt answers the double purpose of lock and latch, and the simplicity of the parts, and consequent diminution of friction in their operations, renders them very durable and not likely to get out of repair.

Having thus set forth my invention and the principles thereof by which it may be distinguished from others of like character, I shall now proceed to point out what I claim therein.

The combination of the stationary knob with a check-bolt moved by a key or knob, as described, the whole being arranged and operating substantially in the manner and for the purposes hereinbefore explained.

In testimony that the foregoing is a true description of my said invention and improvements I have hereto set my signature this 6th day of March, in the year 1843.

ALBERT BINGHAM.

Witnesses:

R. H. EDDY,

EZRA LINCOLN, Jr.